(12) United States Patent
Smith

(10) Patent No.: US 6,643,973 B1
(45) Date of Patent: Nov. 11, 2003

(54) MODULAR ARTICLE HOLDER APPARATUS

(76) Inventor: Clyde D. Smith, 17050 Pike 163, Louisiana, MO (US) 63353

( * ) Notice: Subject to any disclaimer, the term of this patent is extended or adjusted under 35 U.S.C. 154(b) by 0 days.

(21) Appl. No.: 10/020,058

(22) Filed: Dec. 14, 2001

Related U.S. Application Data

(63) Continuation-in-part of application No. 09/659,116, filed on Sep. 13, 2000.

(51) Int. Cl.[7] .............................................. A01K 97/10
(52) U.S. Cl. .............................. 43/21.2; 42/94; 248/533
(58) Field of Search ................................ 43/21.2; 42/94; 248/530, 533; D22/147

(56) References Cited

U.S. PATENT DOCUMENTS 3,327,978 A * 6/1967 Gates ........................ 43/21.2
3,411,739 A * 11/1968 Barfield ..................... 248/533

* cited by examiner

*Primary Examiner*—Kurt Rowan

(57) ABSTRACT

An article holder apparatus includes a first support unit and a plurality of interchangeable support bracket modules connectable to the first support unit. Each support bracket module is tailor made for supporting a specific article, e.g. a fishing rod, a long gun, or a bow. The first support un article reception portion. A pair of vertical risers are connected to opposite ends of the V-shaped article reception portion. A pair of horizontal bracket module reception tubes are connected to the vertical risers. Each interchangeable support bracket module includes a pair of horizontal connector rods for reception in the bracket module reception tubes. First bracket module article support means are connected to the connector rods, and second bracket module article support means are connected to a distal end of the first bracket module article support means. A jaw member can be connected to the support bracket module.

4 Claims, 12 Drawing Sheets

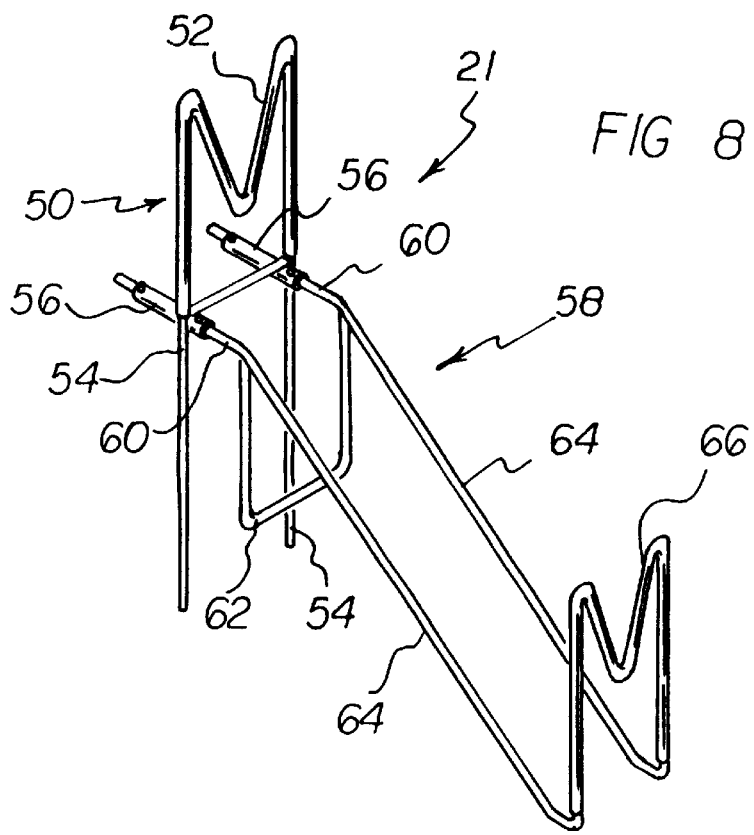
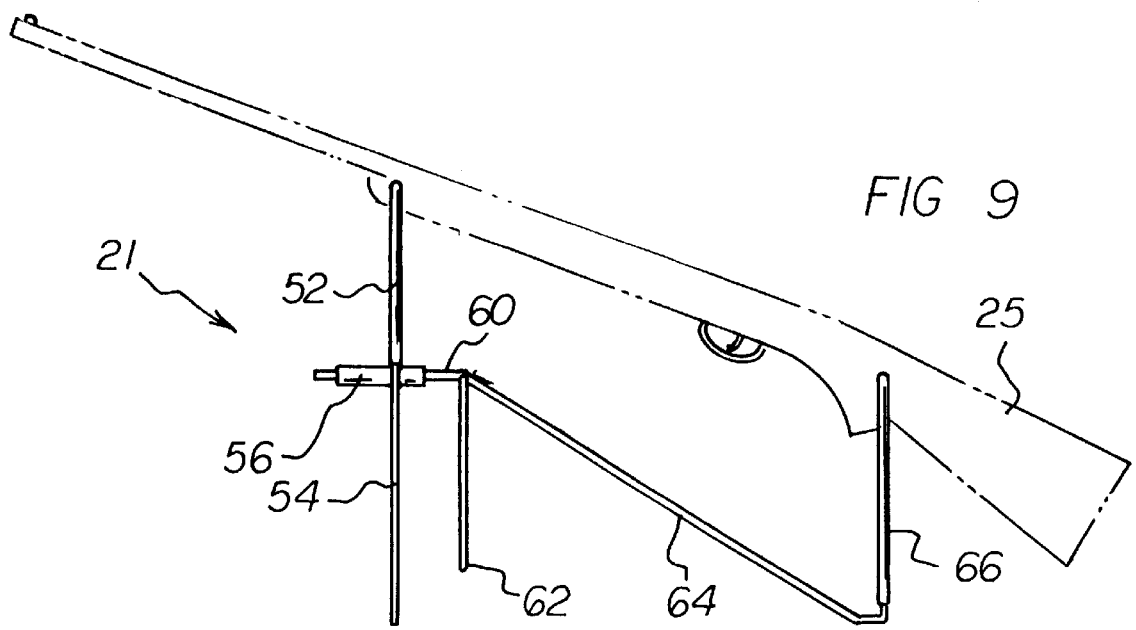

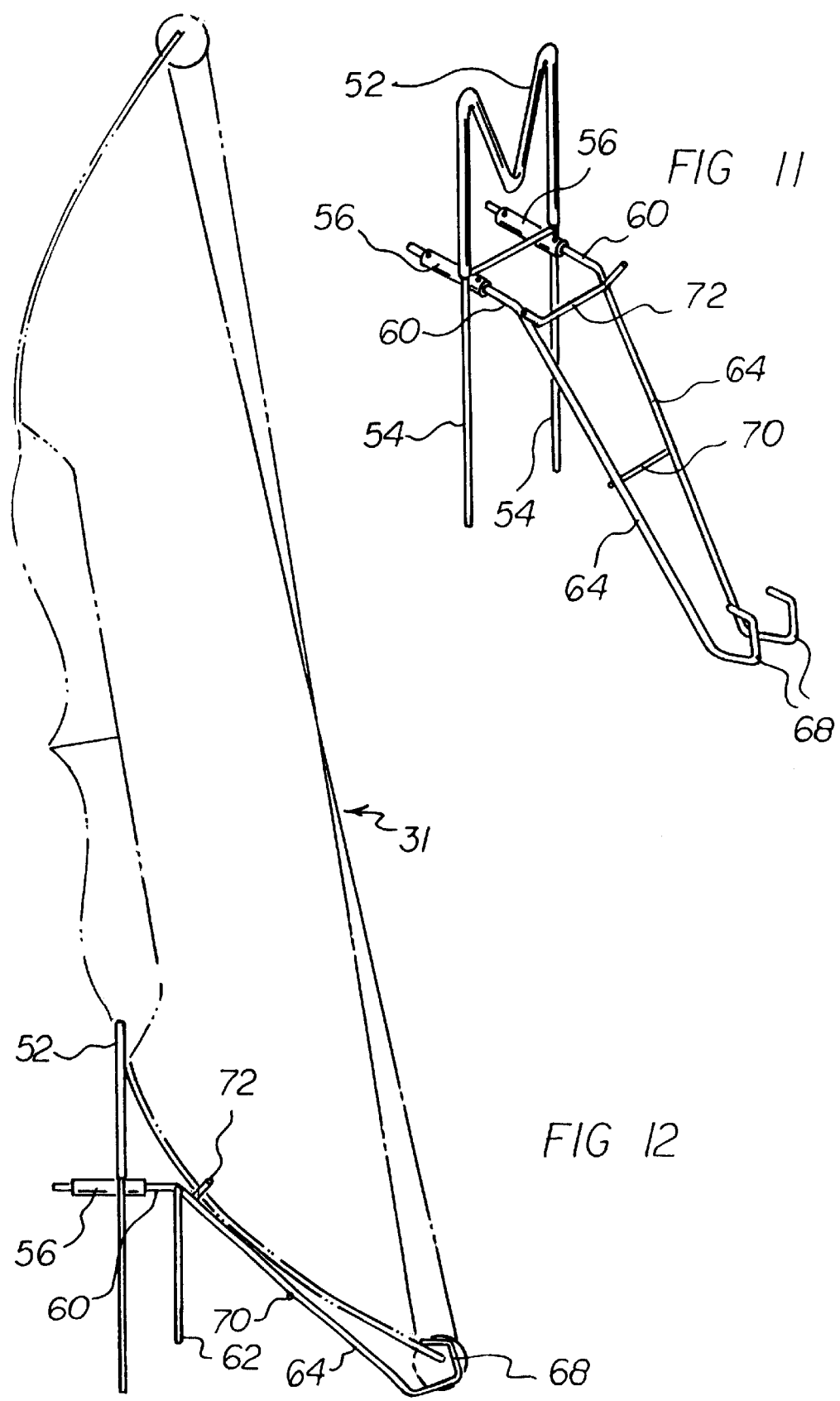

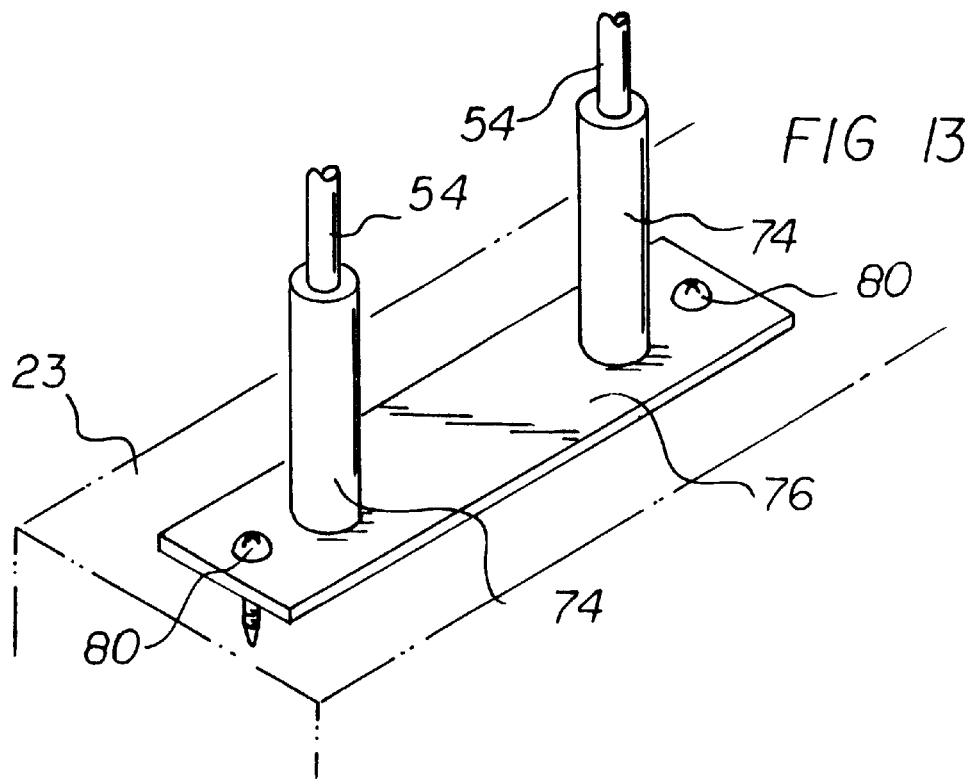
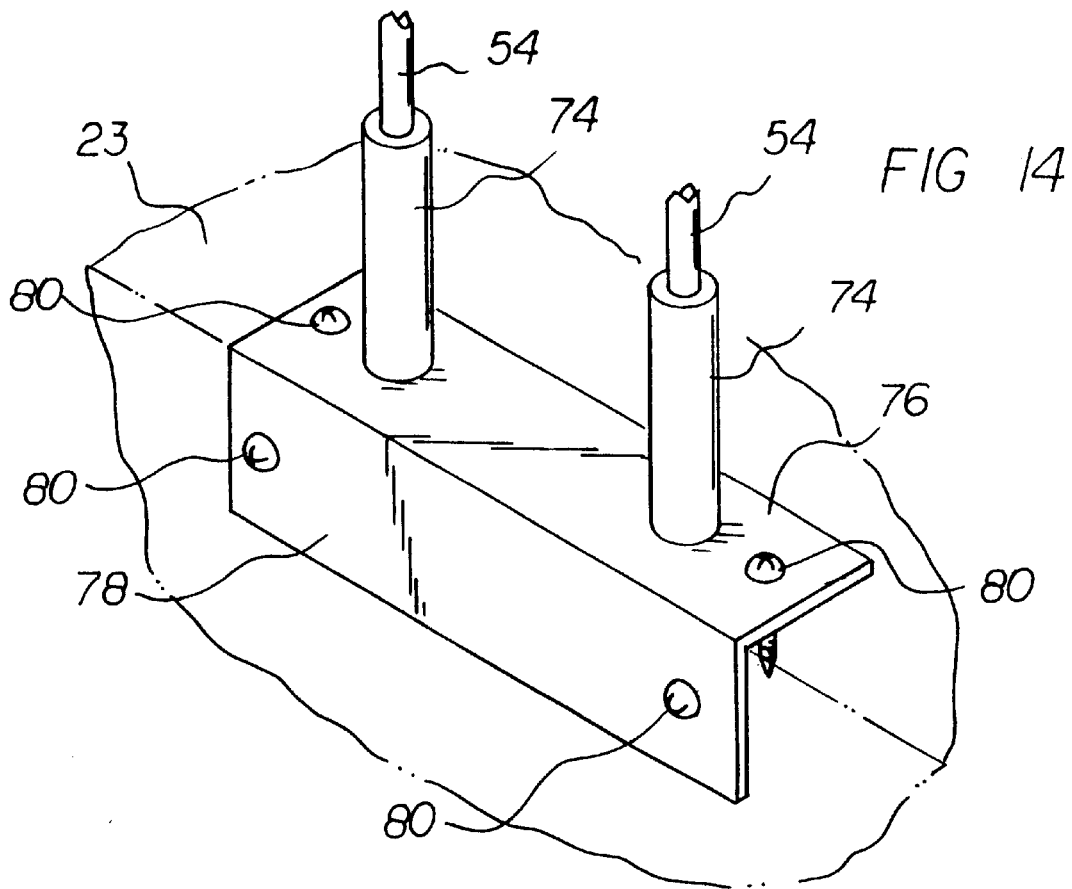

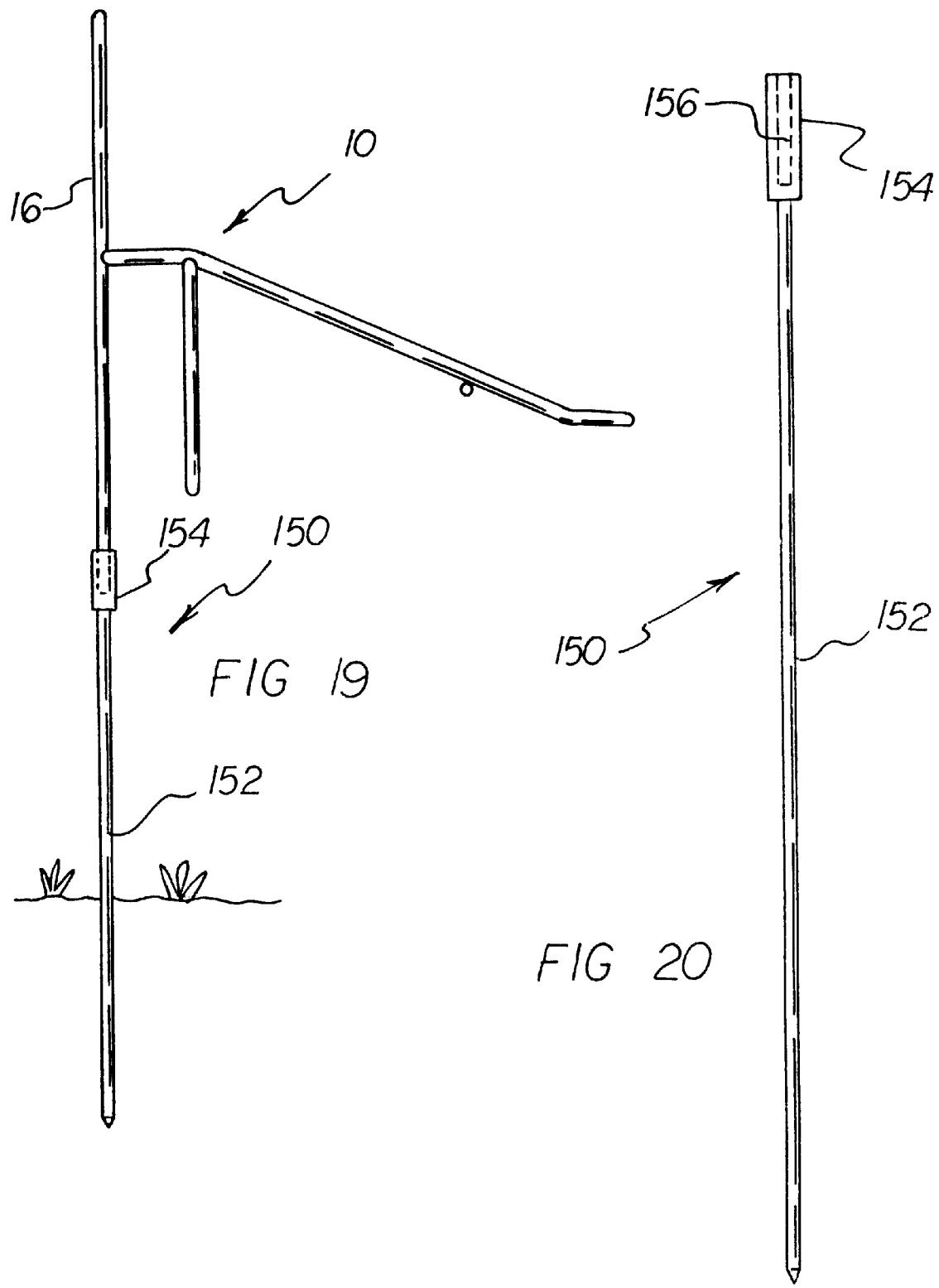

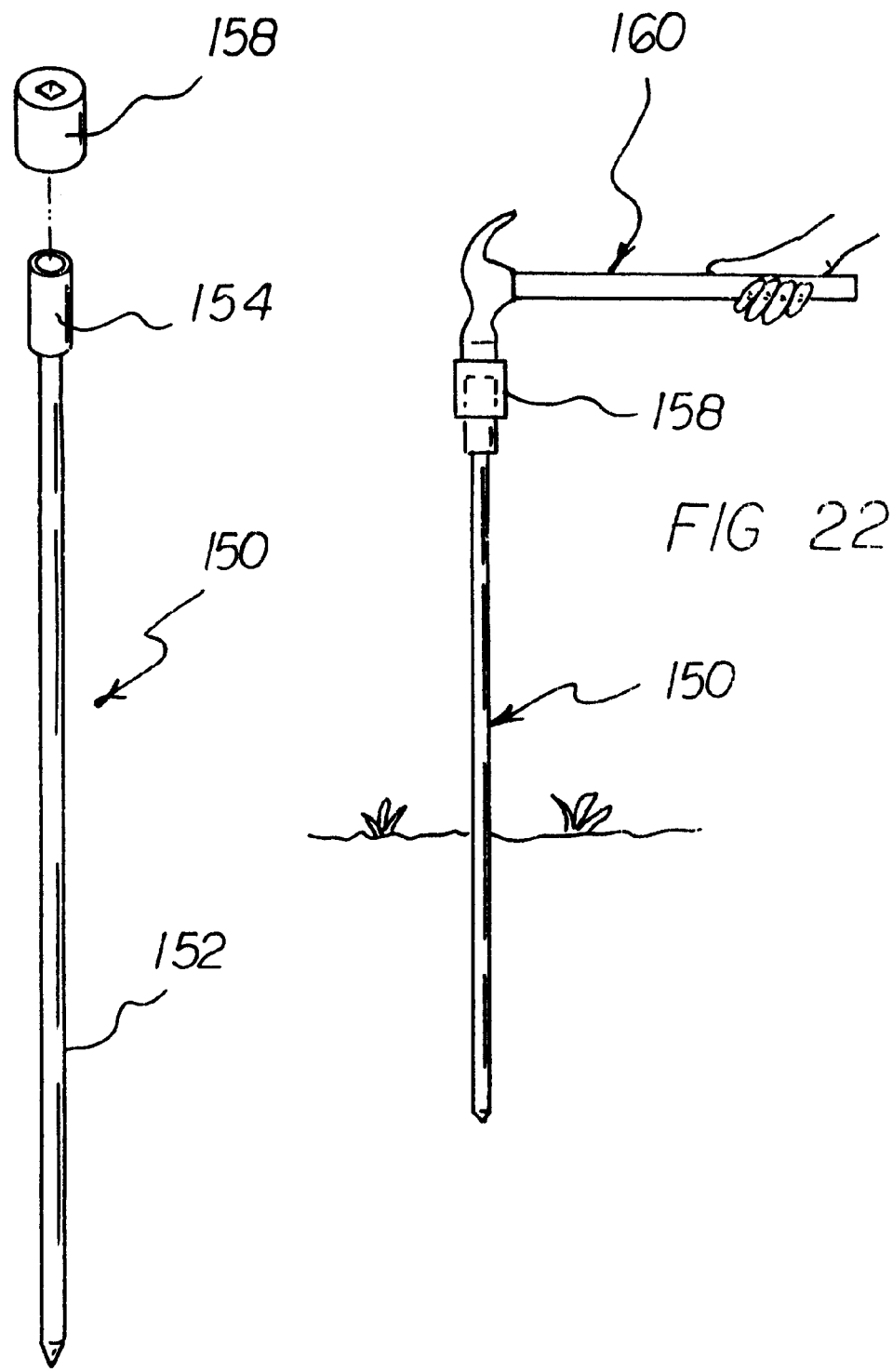

MODULAR ARTICLE HOLDER APPARATUS

RELATED APPLICATION

This application is a continuation-in-part of my prior U.S. patent application, Ser. No. 09/659,116; filed Sep. 13, 2000.

BACKGROUND OF THE INVENTION

1. Field of the Invention

The present invention relates generally to article holders and, more particularly, to modular article holders which can be especially adapted for supporting a variety of articles, either by a horizontally oriented support, such as a boat railing or a dock railing, or by the ground.

2. Description of the Prior Art

Of most special interest for the modular article holder apparatus of the invention are devices for supporting fishing rods, long guns, and bows.

Fishing is an activity that often takes a large amount of patience. A person may use a fishing rod a relatively long time before a fish bites at a hook at the end of a line. Because of the time involved, a person may become bored waiting for a fish to bite. To relieve a person of considerable boredom and inactivity for considerable periods of time, throughout the years, a number of innovations have been developed relating to devices which support a fishing rod, with a hook and line in the water, so that it need not be held by a person. However, when a fish does bite, the fishing rod can easily be grasped by the person, and the person can reel in the fish.

Fishing rod holders come it two basic types: those supported by the ground; and those supported by an above-ground horizontally oriented support, such as a boat railing or a dock railing. Although the present invention relates to fishing rod holders supported by an above-ground, horizontally oriented support, such as a boat railing or a dock railing, those supported by the ground are briefly discussed in relation to desirable features for any fishing rod holder.

One problem associated with a number of conventional ground-supported fishing rod holders relates to the fact that the fishing rod handle are supported in such a way that a longitudinally directed pull along the longitudinal axis of the fishing rod itself tends to pull the fishing rod out from the fishing rod holder. In this respect, for any fishing rod holder, it would be desirable if the fishing rod holder prevents a fishing rod from being pulled out from the fishing rod holder by a longitudinally directed pull along the longitudinal axis of the fishing rod itself.

Another problem associated with a number of conventional ground-supported fishing rod holders relates to a tendency to dislodge the fishing rod from the fishing rod holder when a side to side force is exerted on the fishing rod. This can occur when a hooked fish swims from side to side in the water. In this respect, it would be desirable if a fishing rod holder reduces a tendency for the fishing rod to be dislodged from the fishing rod holder when a side to side force is exerted on the fishing rod.

Yet another problem associated with a number of conventional ground-supported fishing rod holders relates to the ability of a person to quickly remove the fishing rod from the fishing rod holder when a fish strikes at the hook. Moreover, the trajectory of removing the fishing rod from the fishing rod holder should be conducive to retaining the fish on the hook. Such features are not present in some conventional fishing rod holders. In this respect, it would be desirable if a fishing rod holder permitted a person to quickly remove a fishing rod from the fishing rod holder along a trajectory that is conducive to retaining the hooked fish on the hook.

Now turning to fishing rod holders supported by an above-ground, horizontally oriented support, such as a boat, railing or a dock railing, U.S. Pat. No. D397,405, of the present inventor herein, discloses such a fishing rod holder. In this respect, U.S. Pat. No. D397,405 is herein incorporated by, reference. In fact, the features of the fishing rod holder in U.S. Pat. No. D397,405 permit it to be used as a ground-supported fishing rod holder as well. The two spikes which extend downward, can be inserted into the ground. In addition, the V-shaped portion of the fishing rod holder in U.S. Pat. No. D397,405 permits a fishing rod to be retained in the crotch of the V-shaped rod support. As a result, if a fishing rod is.pulled longitudinally along the longitudinal axis of the fishing rod, the handle of the fishing rod is retained by the V-shaped rod support and is blocked from being pulled longitudinally out from the fishing rod holder. Moreover, the V-shaped rod support prevents a fishing rod from being moved side to side when a hooked fish swims from side to side in the water. Also, the fishing rod holder in U.S. Pat. No. D397,405 permits a person to quickly remove a fishing rod from the fishing rod holder along a trajectory that is conducive to retaining the hooked fish on the hook. That is, the desirable trajectory of pulling the fishing rod upward and backward from the fishing rod can be easily accomplished by the fishing rod holder in U.S. Pat. No. D397,405.

Now, by the present invention herein, a fishing rod holder is provided that retains all of the benefits of the fishing rod holder of U.S. Pat. No. D397,405, and, in addition, provides additional features and benefits. It is noted that a portion of the fishing rod holder which is used to secure the fishing rod holder to an above-ground, horizontally oriented support, such as a boat railing or a dock railing, is not with respect to the width of the railing upon which the holder rests. Given the fact that the widths of different boat railings and dock railings vary, it would be desirable if a fishing rod holder were provided that is adjustable to fit a variety of widths of railings.

In addition, U.S. Pat. No. D397,405 does not specifically provide a structure which receives and supports a handle of a fishing rod and the reel of the fishing-rod. So that a fishing rod holder can be effectively used to support a fishing rod and be left unattended, it would be desirable if a fishing rod holder included structures with receive and support and handle and reel of a fishing rod.

Just as with fishing rods, it may be desirable if long guns and bows are at-the-ready, even when they are not in actual use. To avoid the need to carry a long gun or a bow at all times, it would be desirable if a long gun support were provided and if a bow support were provided that would enable a person to have the long gun or the bow supported at-the-ready without the person actually holding the respective long gun or bow.

Moreover, without the need for having three completely different fishing rod, long gun, and bow supports, it would be desirable if a modular article holder were provided which provides modular interchangeability for holding a fishing rod, a long gun and a bow support.

There are times when a person may desire to support a fishing rod, a long gun, or a bow either on a railing or on the ground. In this respect, it would be desirable if a modular article holder apparatus were provided which has alternate support capabilities for either on a railing or on the ground.

As alluded to above, when an article is at-the-ready on an article support, it would be desirable to be able to quickly remove the article from the support, without restrictions imposed by the article support, so that the article can be operated by a person very quickly.

Another feature is especially desirable when a modular article holder apparatus provides support for a long gun. Since long guns are often heavy, and since aiming a long gun is often difficult unless partially support by a stable support, it would be desirable if a modular article holder apparatus were provided which permits a person, especially a person who has difficulty in stabilizing a long gun, e.g. a child, to stabilize the long gun with the support as the person aims and shoots the supported long gun.

Thus, while the foregoing body of prior art indicates it to be well known to use article supports, the prior art described above does not teach or suggest a modular article holder apparatus which has the following combination of desirable features: (1) prevents a fishing rod from being pulled out from the fishing rod holder by a longitudinally directed pull along the longitudinal axis of the fishing rod itself; (2) reduces a tendency for the fishing rod to be dislodged from the fishing rod holder when a side to side force is exerted on the fishing rod; (3) permits a person to quickly remove a fishing rod from the fishing rod holder along a trajectory that is conducive to retaining a hooked fish on the hook; (4) is adjustable to fit a variety of widths of railings; (5) includes structures with receive and support the handle and reel of a fishing rod; (6) provides a long gun support that enables a person to have a long gun at-the-ready without holding the long gun; (7) provides a bow support that enables a person to have a bow at-the-ready without holding the bow; (8) provides modular interchangeability for holding a fishing rod, a long gun and a bow support; (9) has alternate support capabilities for either on a railing or on the ground; (10) has accessories for wedge locking the apparatus onto a railing; (11) has an accessory for mounting the apparatus in the ground in an elevated condition; (12) enables a person to quickly remove the article from the support, without restrictions imposed by the article support, so that the article can be operated by the person very quickly; and (13) permits a person, especially a person who has difficulty in stabilizing a long gun, e.g. a child, to stabilize the long gun with the support as the person aims and shoots the supported long gun. The foregoing desired characteristics are provided by the unique modular article holder apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an article holder apparatus which includes a first support unit and a plurality of interchangeable support bracket modules connectable to the first support unit. The first support unit includes a V-shaped article reception portion. A pair of vertical risers are connected to opposite ends of the V-shaped article reception portion for supporting the V-shaped article reception portion. A pair of horizontal-.bracket module reception tubes are connected to the vertical risers below the V-shaped article reception portion. Each interchangeable support bracket module includes a pair of horizontal connector rods for reception in the bracket module reception tubes. First bracket module article support means are connected to the connector rods, and second bracket module article support means are connected to a distal end of the first bracket module article support means. Preferably, the first bracket module article support means slope downward from the connector rods to the second bracket module article support means. The second bracket module article support means can extend upward from the distal end of the first bracket module article support means. A jaw member can be connected to proximal ends of the connector rods and extending downward therefrom. Each second bracket module article support means is tailor made for supporting a specific article, e.g. a fishing rod, a long gun, or a bow.

In general, the article holder apparatus can be used on a railing or on the ground. When used on a railing, the vertical risers are placed on one side of the railing, and the jaw member is positioned on the other side of the railing. As a result, the railing is sandwiched between the vertical risers and the jaw member. The position of the jaw member is locked into a selected position by the connector rods being locked with respect to the bracket module reception tubes by locking bolts. When used on the ground, the vertical risers are forced into the ground. The deeper the vertical risers penetrate the ground, the more stable the support provided by the ground for the article holder apparatus.

The first bracket module article support means can be in a form of a pair of first bracket module article support rods that are connected to the connector rods, and the second bracket module article support means can be in a form of a specially adapted bracket module article support member.

The specially adapted bracket module article support member can be in a form of a fishing rod handle holder portion, a V-shaped long gun reception. portion, and a pair of U-shaped first bow reception portions.

Mounting bracket means can be provided for connection to a support surface. The mounting bracket means includes vertical-riser-reception tubes for receiving the vertical risers through first ends in the vertical-riser-reception tubes. A base plate is connected to second ends of the vertical-riser-reception tubes. The base, plate is oriented horizontally, and the vertical-riser-reception tubes are oriented vertically. A side plate can be connected perpendicularly to an edge of the base plate. The base plate and the side plate are preferably formed as a single L-shaped unit.

More specifically with respect to a fishing rod holder apparatus in accordance with the invention, the fishing rod holder apparatus includes a first support unit which includes a V-shaped rod reception portion and first lateral confinement means for supporting the V-shaped rod reception portion. A second support unit includes railing rest means connected to the first lateral confinement means, for resting on top of a railing. The second support unit also includes second lateral confinement means connected to the railing rest. A third support unit is connected to the second support unit. The third support unit includes a front extension portion connected to the second support unit. A first handle rest portion is connected to the front extension portion. A rear extension portion is connected to the first handle rest portion, and a second handle rest portion is connected to the rear extension portion.

The first lateral confinement means includes a pair of first risers connected to opposite ends of the V-shaped rod reception portion. The railing rest means includes a pair of railing rest members connected to the pair of first risers and includes a U-shaped member. The front extension portion is connected to the second support unit by a downwardly curved portion. The second handle rest portion is connected to the rear extension portion by an upwardly curved portion.

With a second embodiment of the fishing rod holder apparatus of the invention, the second support unit includes first separation distance adjustment means, and the third support unit includes second separation distance adjustment means which engage with the first separation distance adjustment means. A reinforcement strut is connected-between the first risers.

The first separation distance adjustment means includes a pair of adjustment tubes, and the second separation distance adjustment means includes a pair of adjustment rods telescopically received in the adjustment tubes. Each of the adjustment tubes includes a first direction projecting tube portion and a second direction projecting tube portion. The first direction projecting tube portion is longer than the second direction projecting tube portion.

Locking means are provided for locking the first separation distance adjustment means in a selected location with respect to the second separation distance adjustment means. The locking means includes locking bolt reception channels in the adjustment tubes, and locking bolts are received in the locking bolt reception channels.

The above brief description sets forth rather broadly some of the important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a plurality of preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved modular article holder apparatus which has all of the advantages of the prior art and none of the disadvantages.

It is another object of the present invention to provide a new and improved modular article holder apparatus which may be easily and efficiently manufactured and marketed.

It is a further object of the present invention to provide a new and improved modular article holder apparatus which is of durable and reliable construction.

An even further object of the present invention is to provide a new and improved modular article holder apparatus which is susceptible of a low cost of manufacture with regard to both materials and labor, and which accordingly is then susceptible of low prices of sale to the consuming public, thereby making such modular article holder apparatus available to the buying public.

Still yet a further object of the present invention is to provide a new and improved modular article holder apparatus which prevents a fishing rod from being pulled out from the fishing rod holder by a longitudinally directed pull along the longitudinal axis of the fishing rod itself.

Still another object of the present invention is to provide a new and improved modular article holder apparatus that reduces a tendency for the fishing rod to be dislodged from the fishing rod holder when a side to side force is exerted on the fishing rod.

Yet another object of the present invention is to provide a new and improved modular article holder apparatus which permits a person to quickly remove a fishing rod from the fishing rod holder along a trajectory that is conducive to retaining a hooked fish on the hook.

Even another object of the present invention is to provide a new and improved modular article holder apparatus that is adjustable to fit a variety of widths of railings.

Still a further object of the present invention is to provide a new and improved modular article holder apparatus which includes structures with receive and support the handle and reel of a fishing rod.

Yet another object of the present invention is to provide a new and improved modular article holder apparatus that provides a long gun support that enables a person to have a long gun at-the-ready without holding the long gun.

Still another object of the present invention is to provide a new and improved modular article holder apparatus which provides a bow support that enables a person to have a bow at-the-ready without holding the bow.

Yet another object of the present invention is to provide a new and improved modular article holder apparatus that provides modular interchangeability for holding a fishing rod, a long gun and a bow support.

Still a further object of the present invention is to provide a new and improved modular article holder apparatus that has alternate support capabilities for either on a railing or on the ground.

Yet another object of the present invention is to provide a new and improved modular article holder apparatus having accessories for wedge locking the apparatus onto a railing.

Still a further object of the present invention is to provide a new and improved modular article holder apparatus having an accessory for mounting the apparatus in the ground in an elevated condition.

Yet another object of the present invention is to provide a new and improved modular, article holder apparatus which enables a person to quickly remove the article from the support, without restrictions imposed by the article support, so that the article can be operated by the person very quickly.

Still a further object of the present invention is to provide a new and improved modular article holder apparatus that permits a person, especially a person who has difficulty in stabilizing a long gun, e.g. a child, to stabilize the long gun with the support as the person aims and shoots the supported long gun.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 8 is a perspective view of another embodiment of the invention that is used for supporting a long gun.

FIG. 9 is a side view of the embodiment of the invention shown in FIG. 8, wherein a long gun is shown in broken lines.

FIG. 11 is a perspective view showing the support bracket module from FIG. 10 for the bow connected to the first support unit to form a complete article holder apparatus of the invention.

FIG. 12 is a side view of a bow being supported by another bow supporting support bracket module of the invention which includes a jaw member.

FIG. 13 is a perspective view of a mounting bracket for mounting an article holder apparatus of the invention on a flat horizontal surface such as a railing.

FIG. 14 is a perspective view of another mounting bracket for mounting an article holder apparatus of the invention at the perpendicular corner of a horizontal surface, such as a railing.

FIG. 19 is an elevational view showing an article holder apparatus of the invention being supported in an elevated condition relative to the ground by an elevated-ground-mounting accessory according to the invention.

FIG. 20 is an elevational view of the elevated-ground-mounting accessory of FIG. 19.

FIG. 21 is an assembly view in perspective showing the elevated-ground-mounting accessory of FIG. 20 and a socket wrench for facilitating penetration of the accessory into the ground.

FIG. 22 is an elevational view of the elevated-ground-mounting accessory of FIG. 21 schematically illustrating a preferred method of installing same in the ground by use of a force application tool.

DESCRIPTION OF THE PREFERRED EMBODIMENT

With reference to the drawings, a new and improved modular article holder apparatus embodying the principles and concepts of the present invention will be described.

Figure 1:
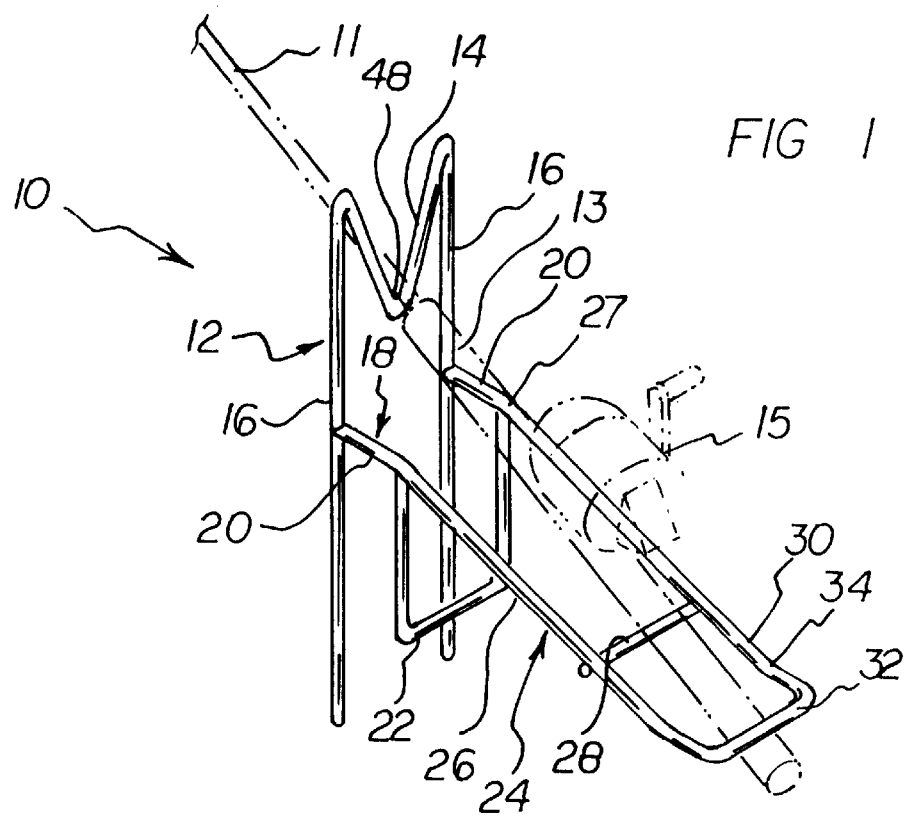
FIG. 1 is a perspective view showing a first embodiment of a fishing rod holder apparatus of the invention, with a fishing rod, including handle and reel, shown in broken lines.
Figure 2:
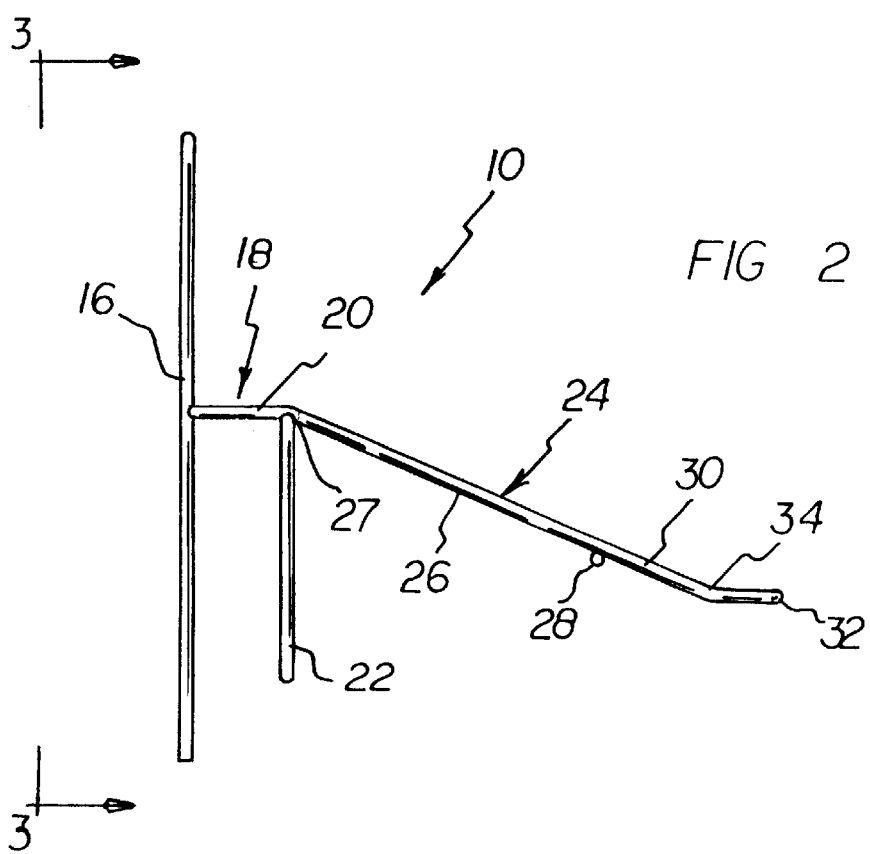
FIG. 2 is a side view of the embodiment of the fishing rod holder apparatus shown in FIG. 1.
Figure 3:
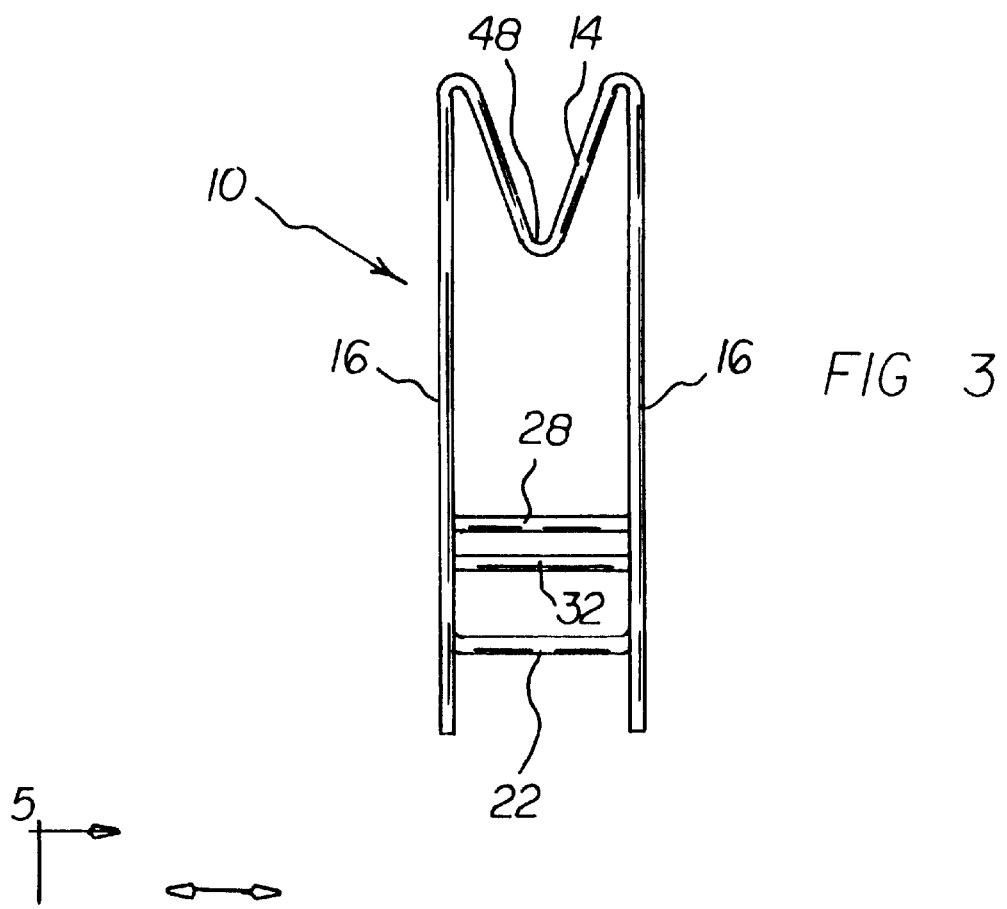
FIG. 3 is a front view of the embodiment of the fishing rod holder apparatus of FIG. 2 taken along line 3—3 thereof.

In FIGS. 1–3, a first embodiment of a fishing rod holder apparatus 10 in accordance with the invention includes a first support unit 12 which includes a V-shaped rod reception portion 14 and first lateral confinement means for supporting the V-shaped rod reception portion 14. A second support unit 18 includes railing rest means connected to the first lateral confinement means, for resting on top of a railing. The second support unit 18 also includes second lateral confinement means connected to the railing rest. A third support unit 24 is connected to the second support unit 18. The third support unit 24 includes a front extension portion 26 connected to the second support unit 18. A first handle rest portion 28 is connected to the front extension portion 26. A rear extension portion 30 is connected to the first handle rest portion 28, and a second handle rest portion 32 is connected to the rear extension portion 30.

The first lateral confinement means includes a pair of first risers 16 connected to opposite ends of the V-shaped rod reception portion 14. The railing rest means includes a pair of railing rest members 20 connected to the pair of first risers 16 and includes a U-shaped member 22. The front extension portion 26 is connected to the second support unit 18 by a downwardly curved portion 27. The second handle rest portion 32 is connected to the rear extension portion 30 by an upwardly curved portion 34.

To use the first embodiment of the fishing rod holder apparatus of the invention, the fishing rod holder apparatus 10 is placed over the top of a railing (not shown) that is on a boat or a dock. The railing would be positioned between the downward projecting portions of the first risers 16 in front of the railing, the horizontally projecting railing rest members 20 on top of the railing, and the downwardly projecting vertical support portion 22 behind the railing. A fishing rod and reel is obtained and includes a rod portion 11 which has a relatively small diameter, a handle portion 13 which is connected to the rod portion 11 and which has a relatively large diameter, and a reel portion 15 supported on the handle portion 13. The rod portion 11, the handle portion 13, and the reel portion 15 are shown in broken lines in FIG. 1.

As shown in FIG. 1, with respect to the fishing rod and reel, the rod portion 11 is placed in the crotch portion 48 of the V-shaped rod reception portion 14. A portion of the handle portion 13 is placed over the first handle rest portion 28, and a portion of the handle portion 13 is placed under the second handle rest portion 32. When this is done, the fishing rod and reel is supported by the fishing rod holder apparatus 10. More specifically, the handle portion 13 forms a lever in which a portion of the lever is supported by the crotch portion 48 of the V-shaped rod reception portion 14, a portion of the lever is supported by the first handle rest portion 28, and a portion of the lever system pushes upward on the bottom of the second handle rest portion 32.

As shown in FIG. 1, the reel portion 15 of the fishing rod and reel is positioned forward of the first handle rest portion 28, between the first handle rest portion 28 and the railing rest members 20. Alternatively, if desired, but not shown in the drawings, the reel portion 15 can be positioned between the first handle rest portion 28 and the second handle rest portion 32. In this way, the reel portion 15 would be cradled in the upwardly curved portion 34 between the rear extension portion 30 and the second handle rest portion 32.

If a fish is hooked and the rod portion 11 is pulled longitudinally forward, the crotch portion 48 of the V-shaped rod reception portion 14 blocks the relatively large diameter handle portion 13 from moving forward past the V-shaped rod reception portion 14. The V-shaped rod reception portion 14 also prevents the rod portion 11 from moving side to side. When a fish is hooked, the person fishing can simply pull the fishing rod and reel upward and out from the fishing rod holder apparatus 10. The first embodiment of the invention can be provided as a unified, one-piece structure.

Turning to FIGS. 4–7, a second embodiment of the fishing rod holder apparatus of the invention is shown. Reference numerals are shown that correspond to like reference numerals that designate like elements shown in the other figures. In addition, the second support unit 18 includes first separation distance adjustment means, and the third support unit 24 includes second separation distance adjustment means which engage with the first separation distance adjustment means. A reinforcement strut 17 is connected between the first risers 16.

The first separation distance adjustment means includes a pair of adjustment tubes 36, and the second separation distance adjustment means includes a pair of adjustment rods 38 telescopically received in the adjustment tubes 36. Each of the adjustment tubes 36 includes a first direction projecting tube portion 40 and a second direction projecting tube portion 42. The first direction projecting tube portion 40 is longer than the second direction projecting tube portion 42.

Locking means are provided for locking the first separation distance adjustment means in a selected location with respect to the second separation distance adjustment means. The locking means includes locking bolt reception channels 44 in the adjustment tubes 36, and locking bolts 46 are received in the locking bolt reception channels 44.

The second embodiment of the fishing rod holder apparatus of the invention is used in substantially the same way as the first embodiment of the fishing rod holder apparatus of the invention described above. However, the second embodiment of the fishing rod holder apparatus of the invention provides the ability to adjust the separation distance 19 between the first risers 16 and the vertical support portion 22 to accommodate railings having a variety of widths. More specifically, the adjustment rods 38 are received in the adjustment tubes 36 and are locked into desired positions by the locking bolts 46, which are shown to be bolts which receive an Allen wrench for tightening and untightening.

Figure 4:
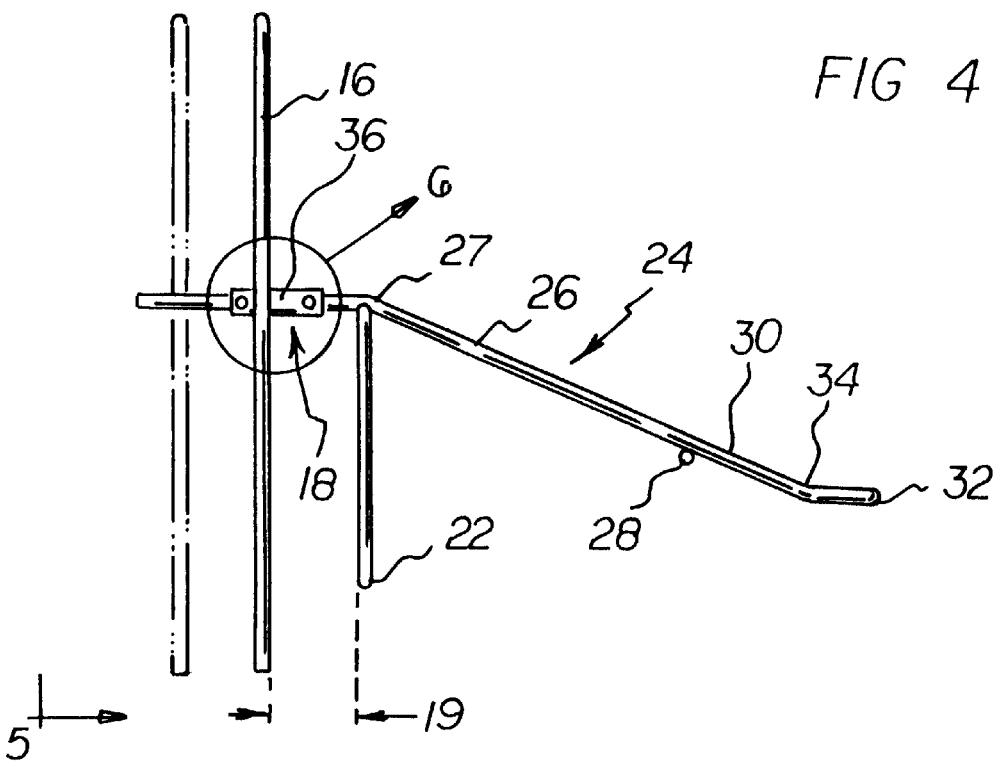
FIG. 4 is a side view of a second embodiment of a fishing rod holder apparatus of the invention which has an adjustable width for being; supported by a railing.
Figure 5:
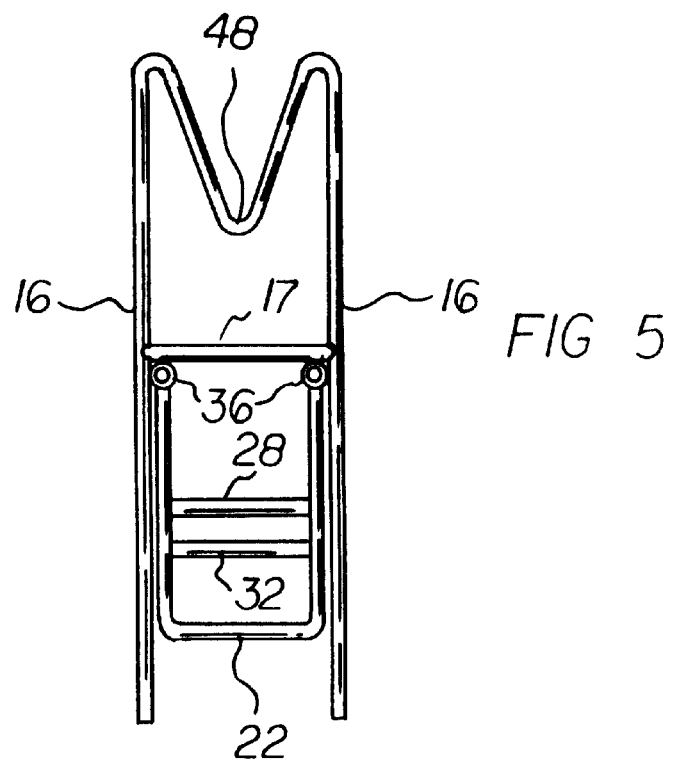
FIG. 5 is a front view of the embodiment of the fishing rod holder apparatus of FIG. 4 taken along line 5—5 thereof.
Figure 6:
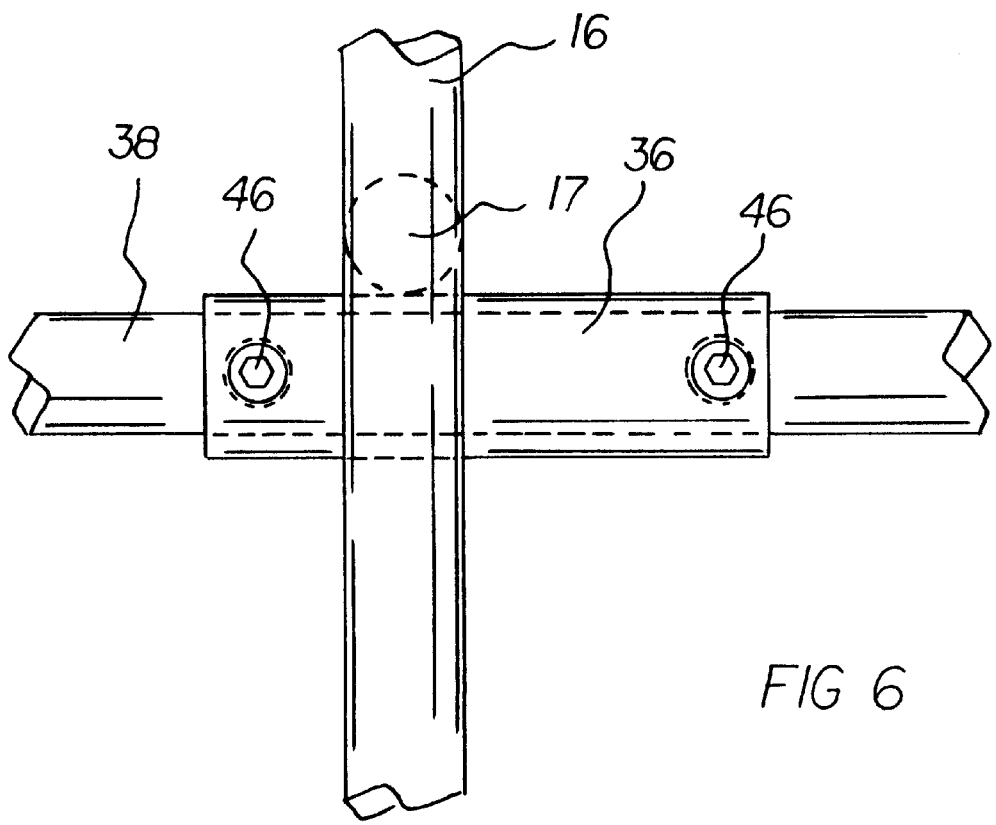
FIG. 6 is an enlarged view of the portion of the embodiment shown in circled region 6 of FIG. 4.
Figure 7:
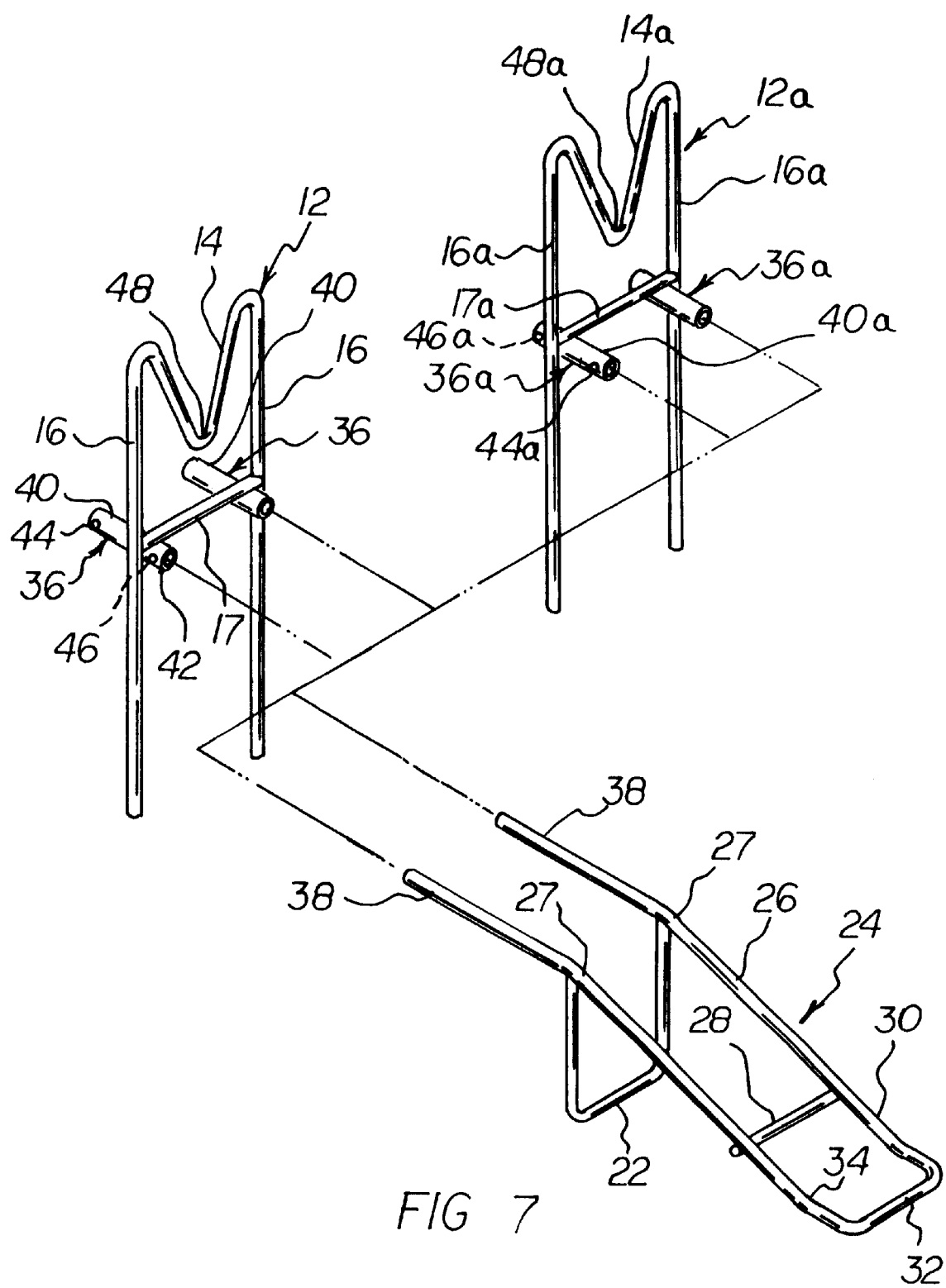
FIG. 7 is an exploded perspective view of the embodiment of the invention shown in FIGS. 4–6, showing a selectable orientation of a portion of the apparatus.

Another feature providing for the adjustment of the separation distance 19 between the first risers 16 and the vertical support portion 22 relates to the orientation of the first support unit 12 so that the relatively long first direction projecting tube portions 40 either project backward, such as shown in FIGS. 4, 6, and 7 (the first support unit 12a and associated figure elements with the "a" labelled reference numerals), or project forward, such as shown with the non-alphabetically labelled first support unit 12 and associated reference numerals shown in FIG. 7. When the first direction projecting tube portions 40 are oriented forward, the vertical support portion 22 and the first risers 16 can be moved relatively close together so that the minimum separation distance 19 is relatively short. In contrast, when the first direction projecting tube portions 40 are oriented backward, the vertical support portion 22 and the first risers 16 can be moved farther apart, and the maximum separation distance 19 is relatively long.

In general, an article holder apparatus 21, in accordance with the invention, includes a first support unit 50 which includes a V-shaped article reception portion 52. A pair of vertical risers 54 are connected to opposite ends of the V-shaped article reception portion 52 for supporting the V-shaped article reception portion 52. A pair of horizontal bracket module reception tubes 56 are connected to the vertical risers 54 below the V-shaped article reception portion 52. A support bracket module 58 includes a pair of horizontal connector rods 60 for reception in the bracket module reception tubes 56. First bracket module article support means 149 are connected to the connector rods 60, and second bracket module article support means 148 are connected to a distal end of the first bracket module article support means 149. Preferably, the first bracket module article support means 149 slope downward from the connector rods 60 to the second bracket module article support means 148. The second bracket module article support means 148 can extend upward from the distal end of the first bracket module article support means 149. A jaw member 62 can be connected to proximal ends of the connector rods 60 and extending downward therefrom.

In general, the article holder apparatus 21 can be used on a railing or on the ground. When used on a railing, the vertical risers 54 are placed on one side of the railing, and the jaw member 62 is positioned on the other side of the railing. As a result, the railing-is sandwiched between the vertical risers 54 and the jaw member 62. The position of the jaw member 62 is locked into a selected position by the connector rods 60 being locked with respect to the bracket module reception tubes 56 by locking bolts 46. When used on the ground, the vertical risers 54 are forced into the ground. The deeper the vertical. risers 54 penetrate the ground, the more stable the support provided by the ground for the article holder apparatus 21.

The first bracket module article support means 149 can be in a form of a pair of first bracket module article support rods 64 that are connected to the connector rods 60, and the second bracket module article support means 148 can be in a form of a specially adapted bracket module article support member 147.

Figure 10:
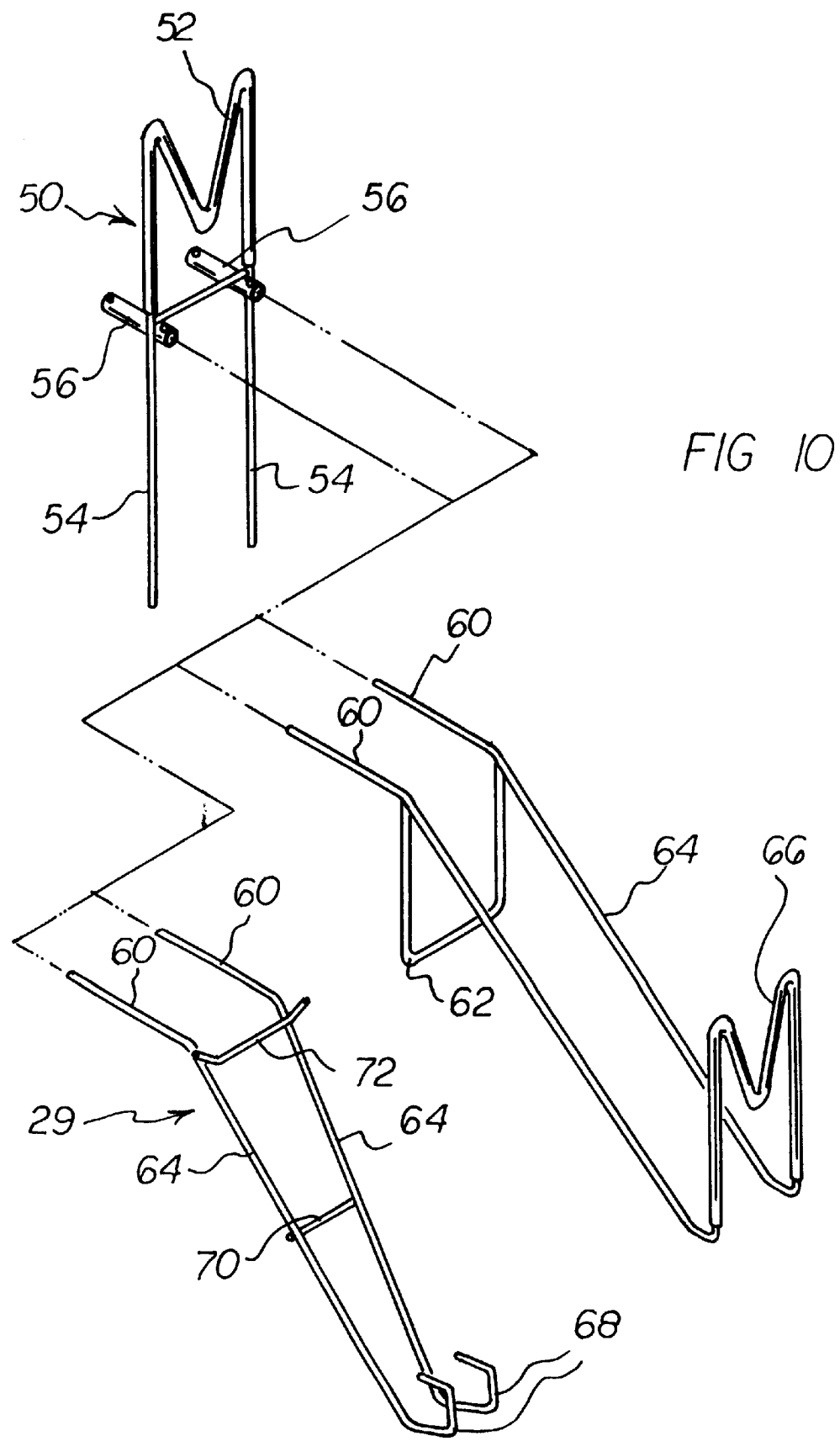
FIG. 10 is a partially exploded perspective view of two different support bracket modules that can be attached to a first support unit, wherein the left support bracket module is for supporting a bow, and wherein the right support bracket module is for supporting a long gun.

As shown in FIGS. 8, 9, and 10, the specially adapted bracket module article support member 147 is in a form of a V-shaped, long gun reception portion 66. As shown in FIG. 9, a long gun 25 is supported by the article holder apparatus 21 of the invention. More specifically, the front portion of the long gun 25 is supported by the V-shaped article reception portion 52, and the rear portion of the long gun 25 is supported by the V-shaped, long gun reception portion 66. The long gun 25 can readily be lifted out from the article holder apparatus 21 with no restriction to its removal.

If desired, the article holder apparatus 21 in FIG. 9 can be used in a different way than illustrated in FIG. 9. That is, the rear of the long gun 25 can be lifted out from the V-shaped, long gun reception portion 66 while retaining the front of the long gun 25 in the V-shaped article reception portion 52. In this way, the V-shaped article reception portion 52 can be used to partially stabilize the long gun 25 as a person aims and shoots the long gun 25.

This may be especially useful when careful aiming is needed and when a child aims and shoots the long gun 25.

The embodiment of the invention shown in FIGS. 8, 9, and 10 can be supported on the ground when the bottom ends of the vertical risers 54 are forced into the ground. Alternatively, this embodiment of the invention can be used on a railing, with the railing sandwiched between the vertical risers 54 and the jaw member 62. Such a railing is locked into position by locking bolts 46 which lock the connector rods 60 with respect to the bracket module reception tubes 56.

As shown in FIGS. 10, 11, and 12, the specially adapted bracket module article support member 147 is in a form of a pair of U-shaped first bow reception portions 68. In FIG. 10, a support bracket module 29 is provided for retaining a bow 31 second bow reception portion 70 is connected between the first bracket module article support rods 64, and a third bow reception portion 72 is connected between the vertical risers 54 proximal to the connector rods 60.

As shown in FIG. 12, the article holder apparatus 21 for the bow 31 provides three regions of support contact between the bow 31 and the apparatus. One region of support contact is between an axle of the bow 31 and the U-shaped first bow reception portions 68. Another region of support contact is between the bow 31 and the third bow reception portion 72. Another region of support contact is between the bow 31 and the V-shaped article reception portion 52.

As shown in FIGS. 13 and 14, mounting bracket means 146 are provided for connection to a support surface 145. The mounting bracket means 146 includes vertical-riser-reception tubes 74 for receiving the vertical risers 54 through first ends in the vertical-riser-reception tubes 74. A base plate 76 is connected to second ends of the vertical-riser-reception tubes 74. The base plate 76 is oriented horizontally, and the vertical-riser-reception tubes 74 are oriented vertically. As shown in FIG. 14, a side plate 78 can be connected perpendicularly to an edge of the base plate 76. The base plate 76 and the side plate 78 are formed as a single L-shaped unit.

The mounting bracket means 146 are useful for mounting an article holder apparatus 21 of the invention onto a flat horizontal surface, such as a railing 23 on a dock. The base plate 76 is secured with fasteners, such as screws 80, onto a horizontal railing 23 surface (such as shown in FIGS. 13 and 14), and the side plate 78 is secured with screws 80 onto an adjacent vertical railing 23 surface (such as shown in FIG. 14). The vertical risers 54 then are sliding received through first ends in the vertical-riser-reception tubes 74 until bottoming on the base plate 76 (or the bottom floor of each tube 74 (not shown)). In this regard the diameter of the hollow bore of each tube 74 is suitably sized with respect to the diameter of each vertical riser 54 to permit a sliding fit between these parts and a secure mounting arrangement.

As will occur to those of ordinary skill, the mounting bracket means 146 may also be employed for similarly mounting the holder 10 (FIGS. 1–7), in which case the bottom spike portions of risers 16 are suitably slidingly received in the vertical-riser-reception tubes 74 through first ends in the vertical-riser-reception tubes 74.

It is sometimes desirable to mount the holder 10 or the holder 21 in the ground in a selected elevated condition. As shown in FIGS. 19–22, elevated-ground-mounting means 150 are provided for such purpose. The preferred elevated-ground-mounting means 150 comprises a pair of ground penetrating spike members 152 on the top of each of which is suitably affixed (as by welding or using a set screw) a vertical-riser-tube 154 for receiving into an open bore 156 through a first end thereof the bottom spike portion of riser 16 or the vertical riser 54. As shown by way of illustrative example in FIG. 19, when a holder 10 (or holder 21) is received in the vertical-riser-tubes 154, after the elevated-ground-mounting means 150 has been selectively driven partially into the ground, the holder 10 is suitably supported in a desired selected elevated condition relative to the ground. The elevated-ground-mounting means 150 may be sold in a kit with either holder 10 or holder 21, or sold separately as an accessory. To facilitate driving the elevated-ground-mounting means 150 into the ground in accordance with the present invention, a conventional suitably sized socket wrench 158 may be fitted over the top of the vertical-riser-tube 154, and an appropriate downward force applied by a suitable force applying tool 160 (e.g. a conventional hammer or the like) substantially as shown in FIGS. 21 and 22.

Figure 15:
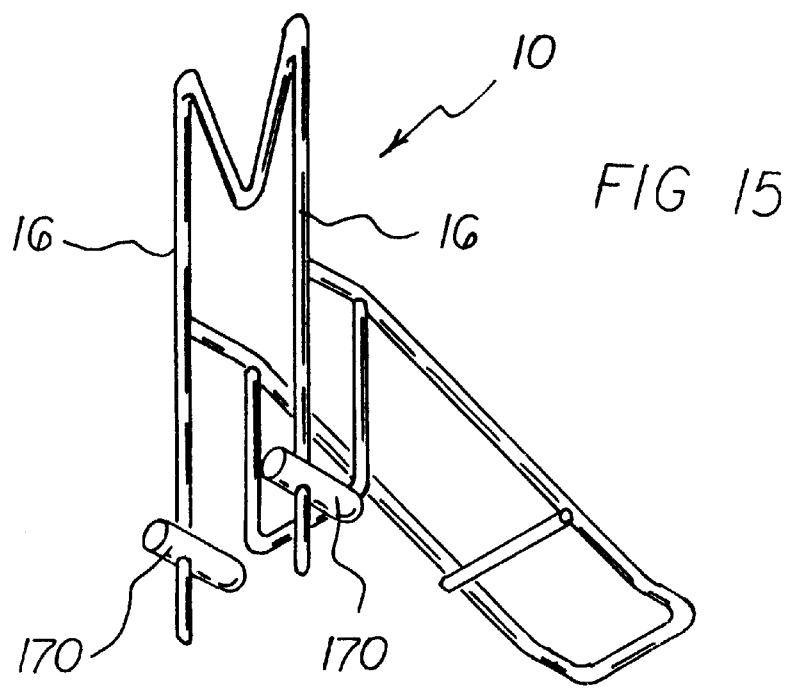
FIG. 15 is a perspective view of an article holder apparatus of the invention having resilient locking fingers on the bottom portions of the vertical risers thereof.
Figure 16:
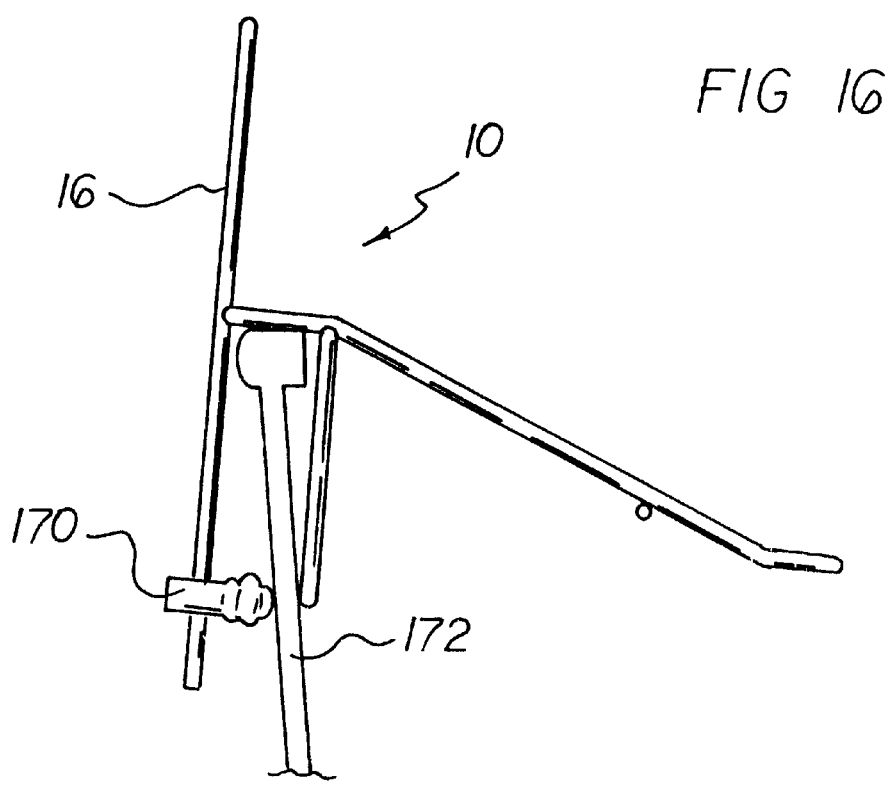
FIG. 16 is an elevational view of the article holder of FIG. 15 positioned on the gunnel of a boat and showing the resilient fingers in a wedge locking condition.
Figure 17:
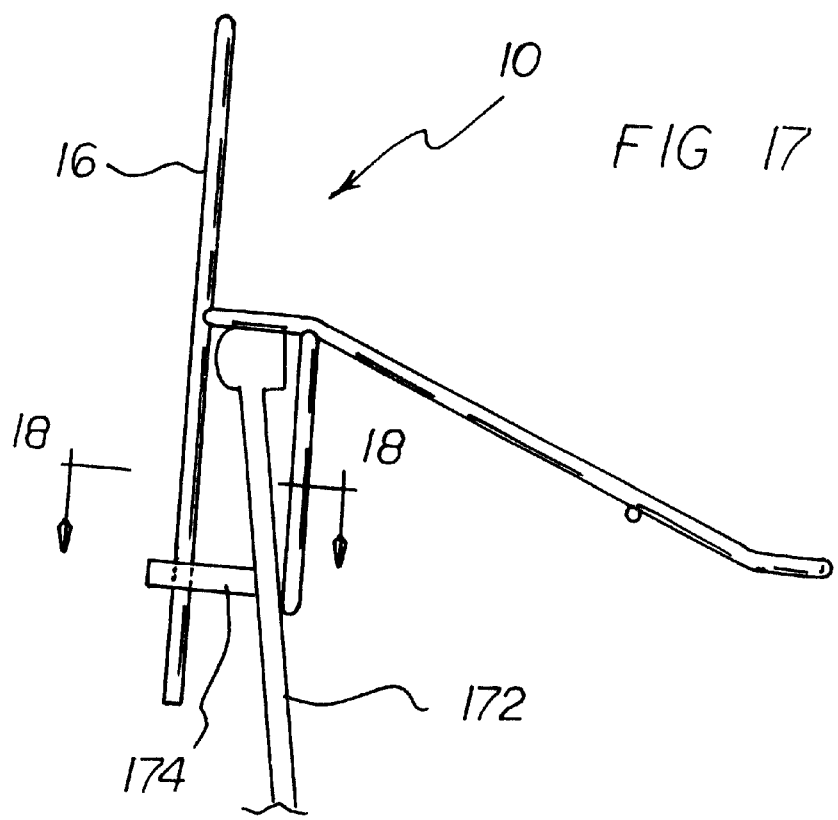
FIG. 17 is an elevational view of an article holder apparatus of the invention positioned on the gunnel of a boat and having an alternatively preferred wedge locking block on the bottom portions of the vertical risers thereof.
Figure 18:
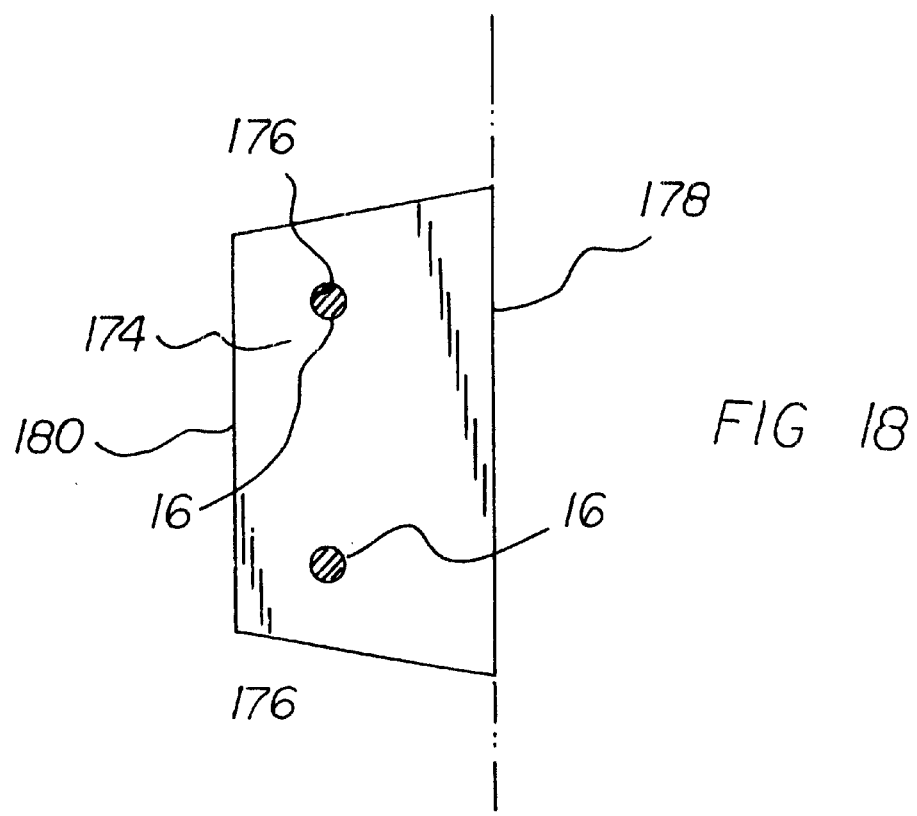
FIG. 18 is a cross-sectional plan view taken along line 18—18 of FIG. 17.

Under certain mounting conditions such as when the holder 10 (or holder 21) is supported on, say, the rail or gunnel of a small boat, the holder may rock back and forth because of a disparity between the transverse dimension of the gunnel and the separation distance between risers 16 and U-shaped member 22. To avoid such, back and forth motion, a pair of resilient fingers 170 are provided, each having a transverse through opening (not labeled) for receiving the bottom spike portion of riser 16 (or vertical risers 54 of holder 21). That is, the resilient fingers 170 are slidably placed on the risers and rotated about the vertical axis of the risers sufficiently to wedgingly engage the outwardly facing surface of the boat's gunnel substantially as shown in FIGS. 15 and 16. It has been found that such wedge engagement between the resilient fingers 170 and the holder 10 (or holder 21) securely locks the holder into its desired operating position (FIG. 16). When removal or unlocking of the holder is desired, the fingers 170 merely are rotated away from the surface of the boat's gunnel 172 and the holder subsequently lifted upwardly and away. The resilient fingers 170 may be fabricated easily from Neoprene rubber or other suitable known plastic materials. FIGS. 17 and 18 depict an alternatively preferred wedge locking means 174 in the form of a block of durable resilient material (e.g. Neoprene rubber or the like). Block 174 has an annular shape (e.g. trapezoidal and a pair of longitudinally spaced through openings 176 extending orthogonally therethrough. The openings have the same longitudinal spacing as the respective vertical axes of the risers 16 or 54. In use, block 174 is slidably displaced onto the risers substantially as shown in FIG. 17 until inside edge 178 of the wedge block 174 engages the outer surface of the boat gunnel 172 thereby securely locking the holder in position substantially as shown in FIG. 17. The outer edge 180 of wedge locking means 174 serves the dual function of providing a bumper to protect the boat if when another boat or structure impinges thereon. Removal or unlocking of the holder is accomplished merely be removing the wedge locking block 174 with a downward sliding motion as viewed in FIG. 17.

It will be appreciated that the resilient fingers 170 of FIGS. 15–16 and the resilient wedge block 174 of FIGS. 17–18 may be sold in a kit with either holder 10 or holder 21, or sold separately as an accessory.

The article holder apparatus 21 is a generic invention that has numerous species. In the discussion above, such species includes an article holder apparatus 21 for a fishing rod, an article holder apparatus 21 for a long gun, and an article holder apparatus 21 for a bow. More specifically, structures and modes of operation of the embodiments of the invention shown in FIGS. 4–7 are similar to the structures and modes of operation of the embodiment of the invention shown in FIGS. 8–12 with respect to the means for attaching the supports to a railing. Even more specifically, the V-shaped article reception portion 14 is substantially equivalent to the V-shaped article reception portion 52. The first risers 16 are substantially equivalent to the vertical risers 54. The adjustment tubes 36 are substantially equivalent to the bracket module reception tubes 56. The pair of adjustment rods 38 are substantially equivalent to the connector rods 60. The U-shaped member 22 is substantially equivalent to the jaw member 62. The front extension portion 26 is substantially equivalent to the first bracket module article support rods 64.

The components of the modular article holder apparatus of the invention can be made from inexpensive and durable metal, rubber and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved modular article holder apparatus that is low in cost, relatively simple in design and operation, and which may advantageously be used to prevent a fishing rod from being pulled out from the fishing rod holder by a longitudinally directed pull along the longitudinal axis of the fishing rod itself. With the invention, a modular article holder apparatus is provided which reduces a tendency for the fishing rod to be dislodged from the fishing rod holder; when a side to side force is exerted on the fishing rod. With the invention, a modular article holder apparatus is provided which permits a person to quickly remove a fishing rod from the fishing rod holder along a trajectory that is conducive to retaining a hooked fish on the hook. With the invention, a modular article holder apparatus is provided which is adjustable to fit a variety of widths of railings. With the invention, a modular article holder apparatus is provided which includes structures with receive and support the handle and reel of a fishing rod.

With the invention, a modular article holder apparatus provides a long gun support that enables a person to have a long gun at-the-ready without holding the long gun. With the invention, a modular article holder apparatus provides a bow support that enables a person to have a bow at-the-ready; without holding the bow. With the invention, a modular article holder apparatus provides modular interchangeability for holding a fishing rod, a long gun and a bow support. With the invention, a modular article holder apparatus is provided which has alternate support capabilities for either on a railing or on the ground. With the invention, a modular article holder apparatus is provided having accessories for wedge locking the apparatus onto a railing. With the invention, a modular article holder apparatus is provided having an accessory for mounting the apparatus in the ground in an elevated condition. With the invention, a modular article holder apparatus is provided which enables a person to quickly remove the article from the support, without restrictions imposed by the article support, so that the article can be operated by the person very quickly. With the invention, a modular article holder apparatus is provided which permits a person, especially a person who has difficulty in stabilizing a long gun, e.g. a child, to stabilize the long gun with the support as the person aims and shoots the supported long gun.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

What is claimed as being new and desired to be protected by LETTERS PATENT of the united states is as follows:

1. An article holder apparatus, comprising:

a first support unit which includes a V-shaped article reception portion, a pair of vertical risers connected to opposite ends of said V-shaped article reception portion for supporting said V-shaped article reception portion, and a pair of horizontal bracket module reception tubes connected to said vertical risers below said V-shaped article reception portion, and a support bracket module which includes a pair of horizontal connector rods for reception in said bracket module reception tubes, first bracket module article support means connected to said connector rods, and second bracket module article support means connected to a distal end of said first bracket module article support means, wherein said first bracket module article support means are in a form of a pair of first bracket module article support rods connected to said connector rods, and said second bracket module article support means are in a form of a specially adapted bracket module article support member, and wherein said specially adapted bracket module article support member is in a form of a pair of U-shaped first bow reception portions, said apparatus further including:
a second bow reception portion connected between said first bracket module article support rods, and
a third bow reception portion connected between said vertical risers proximal to said connector rods.

2. The apparatus of claim 1 wherein said first bracket module article support means slope downward from said connector rods to said second bracket module article support means.

3. The apparatus of claim 2 wherein said second bracket module article support means extend upward from said distal end of said first bracket module article support means.

4. The apparatus of claim 1, further including:
a jaw member connected to proximal ends of said connector rods and extending downward therefrom.

\* \* \* \* \*